United States Patent

[11] 3,585,626

| [72] | Inventor | Cesare Tartarini<br>Via Colombo, 9, Zola Predosa, Italy |
|---|---|---|
| [21] | Appl. No. | 735,792 |
| [22] | Filed | June 10, 1968 |
| [45] | Patented | June 15, 1971 |
| [32] | Priority | June 13, 1967 |
| [33] | | Great Britain |
| [31] | | 1689/67 |

[54] SAFETY ALARM DEVICE FOR DRIVERS
5 Claims, 6 Drawing Figs.

[52] U.S. Cl............................................... 340/279,
200/61.57, 340/240
[51] Int. Cl........................................... G08b 21/00
[50] Field of Search............................................. 340/279,
240, 421; 200/61.57, 81, 86.1; 73/2874, 285;
74/346

[56] References Cited
UNITED STATES PATENTS
2,991,839  7/1961  DeRemer..................... 200/61.57
3,204,056  8/1965  Cooper......................... 200/86.1

Primary Examiner—John W. Caldwell
Assistant Examiner—J. Michael Bobbit
Attorneys—Guido Modiano and Albert Josif

ABSTRACT: This disclosure relates to a safety alarm device for warning a vehicle driver against states of drowsiness, which comprises a tubular sensing member arranged along the rim of a vehicle steering wheel, said sensing member being arranged to determine, according to the pressure with which it is actuated, a delay for a delay device, which, if it is not recharged before the end of such delay, actuates an acoustic alarm device, said sensing member being arranged to act on said delay device in substantially only dynamic manner.

PATENTED JUN 15 1971
3,585,626
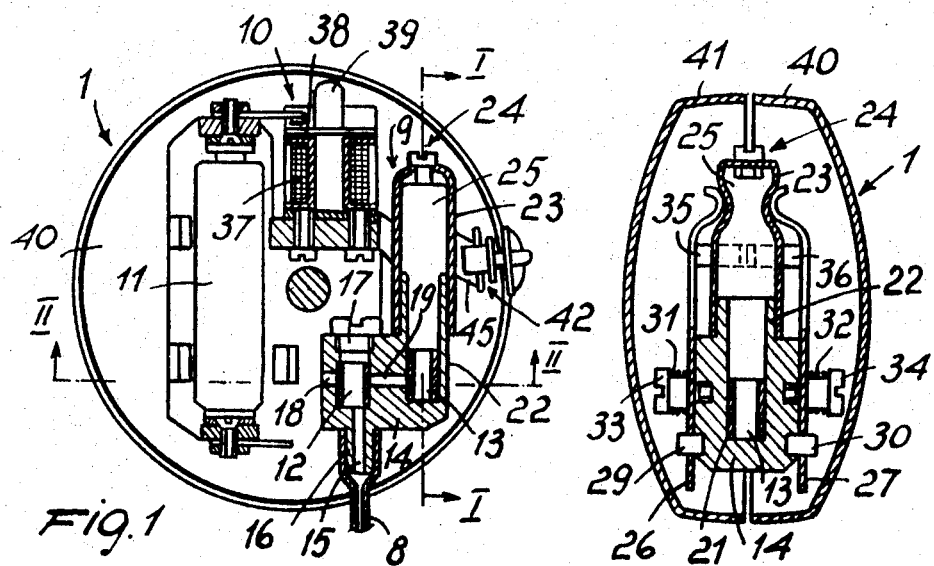
Fig.1
Fig.2
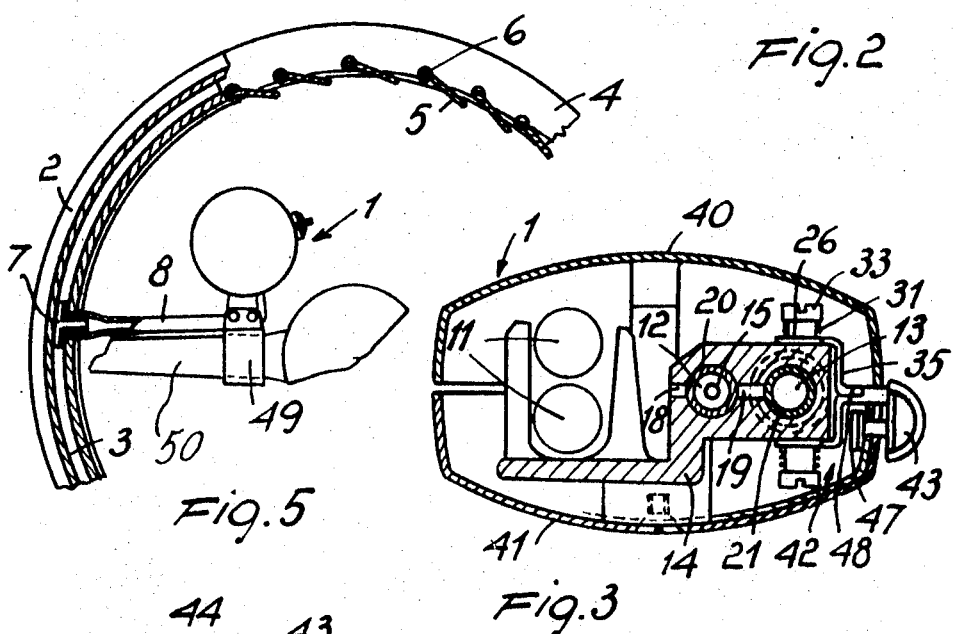
Fig.5
Fig.3
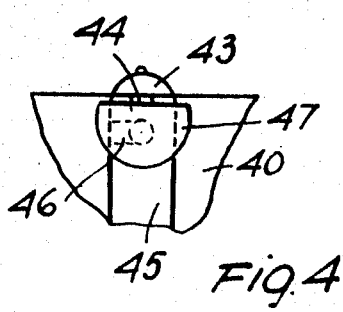
Fig.4
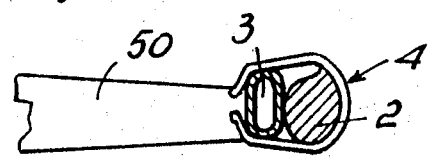
Fig.6
INVENTOR.
Cesare Tartarini
BY
Albert Josif
Agents

SAFETY ALARM DEVICE FOR DRIVERS

BACKGROUND OF THE INVENTION

This invention relates to a safety alarm device designed to warn a vehicle driver against states of drowsiness.

Various alarm devices designed to awaken a sleeping driver have been suggested in order to prevent the large number of road accidents which may be attributed to the drowsiness of a vehicle driver.

Despite the high degree of ingenuity sometimes displayed, such known alarm devices have not met with much success. This lack of success is mainly due to the fact that these known alarm devices generally require a vehicle driver either to maintain a predetermined driving position or to frequently effect a particular movement which is additional operation to the normal driving operations. The known safety alarm devices which require the driver to maintain a relatively constant driving position are further disadvantageous in that it is necessary for the driver to wear some part of the device. The known safety alarm devices which require the driver to carry out a special complicated operation at frequent intervals, are disadvantageous in that they tend to distract the attention of the driver from the road and thus create a potential danger which is not compatible with a safety device.

Safety devices of the first type, i.e. those which are actuated when the position of the driver's body changes, are based on a dipper interrupter which closes and actuates an acoustic signal, for example when the driver bends.

Safety devices of the second type, i.e. those which require the driver to carry out a special operation at frequent intervals, generally comprise a button which must be pushed from time to time and which returns a timer device to zero, said timer device being arranged to actuate an acoustic signal if not returned to zero within a predetermined time interval.

The main object of the invention is that of providing a safety alarm device for awakening a drowsing vehicle driver which is not subject to the described disadvantages of known devices.

Another object of the invention is that of providing a safety alarm device which does not need to be fitted to the vehicle driver's body and does not require the driver to maintain a fixed driving position or change his particular driving habits.

Another object of the invention is that of providing a safety alarm device which practically does not require the river to carry out any supplementary complicated operation.

Another object of the invention is that of providing a safety alarm device which tends to direct the driver's attention to the driving controls.

A further object of the invention is that of providing a safety alarm device which may readily be installed in any type of motor vehicle, which has a complete autonomy and which may, if desired, be connected to the electric energy source of the vehicle.

A further object of the invention is that of providing a safety alarm device which may readily be deactuated when desired.

Another object of the invention is that of providing a safety alarm device which is very effective in the sense that it operates at the first signs of drowsiness on the part of the driver.

A still further object of the invention is that of providing a safety alarm device which is of sure working and economic manufacture.

SUMMARY OF THE INVENTION

According to the invention there is provided a safety alarm device for warning a vehicle driver against states of drowsiness, which comprises a sensing member arranged along the rim of vehicle steering wheel, a pneumatic delaying device, a duct means for communication between said sensing member and said delaying device, valve means in said duct means, and an acoustic signalling means arranged for actuation by said delaying device.

BRIEF DESCRIPTION OF THE DRAWING

The invention will more clearly be understood from the following detailed description of an embodiment of a safety alarm device according to the invention, illustrated by way of example in the accompanying drawing in which:

FIG. 1 is a cross-sectional view of a safety alarm device constructed in accordance with the invention;

FIG. 2 is a cross-sectional view along the line 1–I of Fig. 1;

FIG. 3 is a cross-sectional view along the line II–II of FIG. 1;

FIG. 4 is a side view of the safety alarm device of FIGS. 1 to 3 and shows a deactuation knob of the device;

FIG. 5 shows a motor vehicle steering wheel with the control member of the safety alarm device of FIGS. 1 to 4; and FIG. 6 is a normal cross-sectional view of the rim of a motor vehicle steering wheel to which the control member of the safety alarm device of FIGS. 1 to 3 has been fitted.

DESCRIPTION OF THE PREFERRED EMBODIMENT

With reference to the drawings, n which like reference numerals denote like parts, reference numeral 1 generally indicates a safety alarm device which includes a delaying and an acoustic signalling device, while reference numeral 2 indicates the rim of a motor vehicle steering wheel on which the control or sensing member 3 of the safety device is mounted.

Said sensing member 3 is secured to the steering wheel by means of a sheath 4 (FIG. 5) which is secured, in conventional manner, by a lace or cord 5 which passes through a plurality of peripheral lace holes or eyes provided in said sheath 4. Said sheath 4 is also designed to hide or cover said sensing member 3.

Said control or sensing member 3, which senses the conditions of the vehicle driver, is a tube which is arranged along the inner circumference of the steering wheel rim 2. Such tube is produced in a substantially airtight and resilient material and is formed as an endless ring with its ends connected in a T-junction 7.

The inwardly projecting arm of said T-junction is connected to a duct 8 which connects the interior of said control member 3 with the device 1.

Said device 1 comprises a timer which is generally indicated at 9 (FIG. 1), an acoustic signalling device 10 and batteries 11 which are designed to provide electric energy for said acoustic signaling device. Alternatively electric power may be supplied by the electric energy source of the vehicle.

Said timer 9 essentially comprises a pair of cavities 12 and 13 provided in a boy 14. Said cavity 12 communicates with a hole 15 provided in a union 16 in which said duct 8 is engaged. The interior of said cavity 12, which is closed by a screw 17, also communicates with two holes 18 and 19. Said hole 18 is in communication with the external ambient while said hole 19 connects said cavity 12 with said cavity 13.

Inside said cavity 12 (see FIG. 3) is also arranged a tube 20 of extensible material, said tube 20 being slit along a generatrix on the side opposite said hole 18.

As previously pointed out, said cavities 12 and 13 are in communication through said hole 19. However said hole 19, as the hole 18, is normally closed by a tube 21 which is inserted inside said cavity 13 and which is completely similar to said tube 20.

From the preceding description it should appear that said tube 3 forms the active member of a kind of lung member having a delivery collector, constituted by the cavity 13, and a suction collector constituted by the cavity 12.

It will be clear that, if the tube 3 is depressed, and assuming the latter to be full of air, a flow of air will be caused to pass through the union 7, the duct 8, the hole 15, the cavity 12, the hole 19, and then the cavity 13. It will also be clear that if said tube 3 is subsequently released it will tend to reassume its original form, sucking air through the hole 18, the cavity 12, the hole 15, and the duct or pipe 8. This is because said two tubes 20 and 21 which, as slated, are formed in extensible elastic material and are slit along a generatrix, act as shutters respectively for the suction valve, which comprises the hole 18, the tube 20, and the cavity 12, and the delivery valve, which comprises the hole 19, the tube 21, and the cavity 13. Moreover, the quantity of air caused to flow into the cavity 13, is essentially dependent on the degree of depression to which the tube 3 is subjected.

From said body 14, and coaxial with said cavity 13, projects a kind of union 22 on which is engaged a cap 23 which is formed in relatively flexible gas impermeable material of low extensibility. On said cap 23 is secured a register 24, which comprises a bolt and relative nut, adapted, according to the relative degree of screwing, to determine a variation of the escape opening for air contained in a closed space 25 bounded by the cap 23 and said cavity 13.

On both sides of said body 14 (see FIG. 2) are secured flat springs 26 and 27 which have a free end bent which urges against said flexible cap 23 and depresses the latter. Said springs 26 and 27 are engaged at the other end thereof by pins 29 and 30 and by coil springs 31 and 32, which are mounted on relative screws 33 and 34 screwed in respective threaded holes provided is said body 14.

Said flat springs 26 and 27 are also provided, adjacent their bent end, with lugs 35 and 36 which are bent through 90° and project to such an extent as to come into contact with each other when said springs 26 and 27 are slightly displaced from the body 14.

It will be evident that by acting on said tube or sensing member 3, that is causing air to pass into said space 25, the lid or cap 23 is caused to stretch due to the increase in pressure created inside said space 25 and, consequently the springs 26 and 27 diverge and the relative separation of the lugs 35 and 36 occurs. Said lugs 35 and 36 come together again only when the pressure inside said space 25 passes below a predetermined valve which will be reached, evidently, after a time interval which depends on the degree of depression to which the tube 3 is subjected and the escape cross section which is adjustable by means of said screw register 24.

Said springs 26 and 27 constitute the equipment of a switch designed to close the circuit of said signalling device 10. Such circuit comprises, besides said batteries 11, a bell electromagnet 37, which carries on its core 38 a striker 39 designed to act on a top or cover 40 which covers a kind of base 41 and from which said body 14 projects. Said base 41 together with said cover 40 form an envelope or case for the timing and signalling unit.

The safety alarm device according to the invention is completed by a deactuation switch 42 which comprises a knob 43, whose pin is engaged in a slot 44 provided in said cover 40 and is secured to the latter by means of a leaf spring 45. Said leaf spring 45 has a slot 46 which is perpendicular to the slot 44. To the pin of said knob 43 is connected an eccentric member 47 designed to act, when desired, on a folded portion 48 of said lug 35. Securing means are provided on said base 41 in order to secure the safety alarm device to a motor vehicle and preferably, through a strip 49, to a radial spoke 50 of the vehicle steering wheel.

The working of the safety alarm device according to the invention, assuming that the device is properly installed and actuated, with the actuation of said switch 42, is very simple. The vehicle driver depresses the tube 3 every so often, for example every 10 to 15 seconds, and this causes a certain quantity of air to enter the space 25 and maintain the cap 23 extended and, consequently the lugs or contacts 35 and 36. If the driver should become drowsy, because of the reduction of pressure on the tube 3 and the consequent insufficient pumping action generated, the cap 23 contracts and the acoustic signalling device is actuated.

I claim:

1. A safety alarm device for warning a vehicle driver against states of drowsiness including a sensing member arranged along the rim of a vehicle steering wheel, a pneumatic delaying device arranged for actuation of an acoustic signalling device, a pipe connecting said sensing member with said delaying device, said sensing member being at intervals actuated by the driver in order to send a pulse of air to said delaying device, wherein according to the improvement said delaying device comprises a rigid body means defining a cavity in said body, a duct connecting said cavity with said pipe, a cap member for closing said cavity, contact members for actuating said acoustic signalling device, said contact member being closed by the cap member according to the pressure in said cavity, a discharge opening for the air contained in said cavity, adjustment means for adjusting the wideness of said discharge opening and wherein the delaying device further comprises a first valve arranged to close said duct and to open it towards said cavity and a second valve connecting said duct with the surrounding atmosphere and opening towards said sensing member.

2. A safety alarm device as claimed in claim 1, wherein said contact members comprise a pair of flat springs arranged on opposite sides of said rigid body, one end of each of said flat springs normally being in contact with said cap member, lugs provided on said flat springs and arranged to come into mutual contact and actuate said acoustic device when the pressure in said cap member drops below a predetermined level.

3. A safety alarm device as claimed in claim 1, wherein each of said valve members comprises a cylindrical cavity provided in said rigid body and in communication with said duct, an airtight flexible tube which is slit along a generatrix and arranged in said cylindrical cavity.

4. A safety alarm device as claimed in claim 1, wherein said sensing member comprises a tube connected with said pipe and extending along the rim of the steering wheel and a flexible sheath member for securing said tube to said rim.

5. A safety alarm device as claimed in claim 1 wherein said acoustic signalling device comprises a case secured to the vehicle steering wheel and containing said delaying device, an electromagnet having a core arranged in said case and a battery arranged in said case to supply electric energy to said electromagnet, the core having a striker acting on the case, a switch for the deactuation of the acoustic signalling device.